US008311416B2

(12) United States Patent
Bai

(10) Patent No.: US 8,311,416 B2
(45) Date of Patent: Nov. 13, 2012

(54) METHOD AND APPARATUS FOR GENERATING OPTICAL DUO BINARY SIGNALS WITH FREQUENCY CHIRP

(75) Inventor: Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/113,733

(22) Filed: May 23, 2011

(65) Prior Publication Data

US 2012/0027420 A1  Feb. 2, 2012

Related U.S. Application Data

(62) Division of application No. 11/283,177, filed on Nov. 18, 2005, now abandoned.

(51) Int. Cl.
*H04B 10/00* (2006.01)

(52) U.S. Cl. ......... 398/199; 398/182; 398/193; 398/183

(58) Field of Classification Search ........... 398/182–201
See application file for complete search history.

(56) References Cited

U.S. PATENT DOCUMENTS

| | | | | |
|---|---|---|---|---|
| 4,118,686 A | * | 10/1978 | Lender | 375/292 |
| 5,144,287 A | | 9/1992 | Remson | |
| 5,400,082 A | | 3/1995 | Kamiya | |
| 5,543,952 A | * | 8/1996 | Yonenaga et al. | 398/185 |
| 5,867,534 A | * | 2/1999 | Price et al. | 375/286 |
| 5,892,858 A | * | 4/1999 | Vaziri et al. | 385/2 |
| 5,917,638 A | * | 6/1999 | Franck et al. | 398/201 |
| 5,920,416 A | * | 7/1999 | Beylat et al. | 398/185 |
| 6,188,497 B1 | * | 2/2001 | Franck et al. | 398/183 |
| 6,337,756 B1 | * | 1/2002 | Djupsjobacka | 398/183 |
| 6,421,155 B1 | * | 7/2002 | Yano | 398/183 |
| 6,424,444 B1 | * | 7/2002 | Kahn et al. | 398/141 |
| 6,445,476 B1 | * | 9/2002 | Kahn et al. | 398/189 |
| 6,522,438 B1 | * | 2/2003 | Mizuhara | 398/189 |
| 6,616,353 B1 | * | 9/2003 | Helkey | 398/183 |
| 6,623,188 B1 | * | 9/2003 | Dimmick et al. | 398/182 |
| 6,697,576 B1 | * | 2/2004 | Rollins et al. | 398/159 |
| 6,804,472 B1 | * | 10/2004 | Ho | 398/193 |
| 6,865,348 B2 | * | 3/2005 | Miyamoto et al. | 398/183 |
| 7,280,767 B1 | * | 10/2007 | Ho et al. | 398/183 |
| 7,340,182 B2 | * | 3/2008 | Uemura et al. | 398/183 |

(Continued)

FOREIGN PATENT DOCUMENTS

CN    1494251 A    5/2004

(Continued)

OTHER PUBLICATIONS

International Search Report dated Jan. 18, 2007 in connection with International Patent Application No. PCT/CN2006/003114.

(Continued)

*Primary Examiner* — Agustin Bello

(57) ABSTRACT

This present disclosure provides an optical transmission method and system. The system includes a pre-coder for pre-coding an input signal into a first pre-coded signal, an encoder/separator coupled to the first pre-coded signal and arranged to encode the first and second pre-coded signals into a first encoded signal with 0 degree phase shift and a second encoded signal with 180 degree phase shift, and an optical modulator for providing optical modulation to the first and second encoded signals with a light source such that the intensity of an output optical duo-binary (ODB) signal with frequency chirp has identical logic sequence as the input signal.

15 Claims, 11 Drawing Sheets

U.S. PATENT DOCUMENTS

| | | | |
|---|---|---|---|
| 7,606,501 B2 * | 10/2009 | Bai | 398/183 |
| 7,734,190 B2 * | 6/2010 | Bai | 398/185 |
| 7,792,433 B2 * | 9/2010 | Bai | 398/183 |
| 8,059,970 B2 * | 11/2011 | Harley et al. | 398/198 |
| 2001/0017724 A1 * | 8/2001 | Miyamoto et al. | 359/158 |
| 2004/0062554 A1 * | 4/2004 | Lee et al. | 398/201 |
| 2004/0086225 A1 * | 5/2004 | Kim et al. | 385/31 |
| 2005/0019040 A1 * | 1/2005 | Trutna, Jr. | 398/183 |
| 2005/0053384 A1 * | 3/2005 | Kim et al. | 398/183 |
| 2006/0127102 A1 * | 6/2006 | Roberts et al. | 398/182 |
| 2007/0116477 A1 * | 5/2007 | Oberland | 398/188 |

FOREIGN PATENT DOCUMENTS

| | | |
|---|---|---|
| CN | 1497893 A | 5/2004 |
| CN | 1595843 A | 3/2005 |
| CN | 101313496 A | 11/2008 |
| WO | WO 2005/055475 A1 | 6/2005 |

OTHER PUBLICATIONS

Written Opinion of the International Searching Authority dated Jan. 18, 2007 in connection with International Patent Application No. PCT/CN2006/003114.

Communication pursuant to Article 94(3) EPC dated Nov. 27, 2008 in connection with European Patent Application No. 06 817 852.4.

Partial Translation of Office Action dated Jun. 28, 2010 in connection with Chinese Patent Application No. 200680043204.7.

Kim, Sung Kee, et al., "Transmission Performance or 10Gb/s Optical Duobinary Transmission Systems Considering Adjustable Chirp of Nonideal LiNbO3Mach-Zehnder Modulators Due to Applied Voltage Ratio and Filter Bandwidth," Journal of Lightwave Technology, vol. 19, No. 4, pp. 465,470. Apr. 2001.

Lee, Hanlim et al., "Cost-Effective Optical Chirped Duobinary Transmitter Using an Electroabsorption Modulated Laser," IEEE Photonics Technology Letters, vol. 17, No. 4, pp. 905-907, Apr. 2005.

Ono, Takashi, et al., "Characteristics of Optical Duobinary Signals in Terabit/s Capacity, High-Spectral Efficiency WAD Systems," Journal of Lightwave Technology, vol. 16, No. 5, pp. 788-797, May 1998.

Wichers, M. et al., Chirped Duobinary Transmission (CDBT) for Mitigating the Self-Phase Modulation Limiting Effect, Optical Society of America, pp. WDD43-1-WDD43-3, 2000.

Yonenaga, Kazushige et al., "Dispersion-Tolerant Optical Transmission System using Duobinary Transmitter and Binary Receiver," Journal of Lightwave Technology, vol. 15, No. 8, pp. 1530-1537, Aug. 1997.

Communication pursuant to Article 94(3) EPC dated Oct. 11, 2011 in connection with European Patent Application No. 06 817 852.4.

Office Action dated Jan. 21, 2011 in connection with U.S. Appl. No. 11/283,177.

* cited by examiner

METHOD AND APPARATUS FOR GENERATING OPTICAL DUO BINARY SIGNALS WITH FREQUENCY CHIRP

CROSS-REFERENCE TO RELATED APPLICATION

This application is a divisional of prior U.S. application Ser. No. 11/283,177 filed Nov. 18, 2005 now abandoned, which is incorporated herein by reference.

BACKGROUND

1. Field of the Invention

The present invention generally relates to an optical transmitter, and more particularly to optical transmission method and apparatus for generating optical duo binary signals with frequency chirp.

2. Description of the Prior Art

In the information age, the demand for optical networks of higher data capacities is constantly increasing. This demand is fueled by many different factors, such as the tremendous growth of the Internet and the World Wide Web. Optical fiber transmission has played a key role in increasing the bandwidth of telecommunications networks. It is the preferred medium for transmission of data at high data rates and over long distances nowadays.

At very high data rates, an inherent chromatic dispersion property, which means different spectral components of the signal traveling at different speeds, in optical fiber transmission fibers causes waveform deterioration and becomes a limiting factor in standard single-mode fiber (SMF). Since there is a large installed base of SMF, a great demand for dispersion tolerant data transmission systems exists.

In standard optical communication systems, such as SONET, PDH, and SDH, data rates are in a hierarchy of 155 Mbps, 622 Mbps, 2.5 Gbps, and 10 Gbps with a multiply factor of four. In SDH terminologies, the data rates above are referred as STM-1, STM-4, STM-16, and STM-64. Chromatic dispersion becomes important when data rate is counted in Gbps magnitude. Here, 10 Gbps data rate is taken as an example. In this regards, the chromatic dispersion of a standard SMF is at 17 ps/nm*km at 1550 nm. The spectral width of a chirp-free optical signal is given by the Fourier transform limit, i.e., the width is equal approximately to the inverse of the minimum pulse duration, or the data rate. Thus for a NRZ (non-return-to-zero) binary signal at 10 Gbps, the minimum pulse duration is 100 ps and the spectral width is around 10 GHz or 0.08 nm. After 70 km transmission in SMF, the signal pulses would be broadened by around 100 ps, the minimum pulse duration or the bit period. Therefore the dispersion limited transmission distance of a chirp-free 10 Gbps NRZ optical signal is about 70 km in SMF.

Various methods, such as ODB (Optical Duo-Binary) modulation, were invented to extend the dispersion limited distance. The characteristic of an ODB signal is that it has three phased modulated states, −1, 0, and +1 while it maintains two states of intensity, which follows the input NRZ signal levels. There is no direct transition between −1 and +1 state. Due to its property, ODB signal has narrower spectral width than NRZ signal. Therefore, ODB signal could be transmitted farther in distance than NRZ signal in SMF.

A classical method of generating ODB signal was described in U.S. Pat. No. 5,543,952, "Optical Transmission System" by Yonenaga, et al. A three-level electrical signal is generated by combining an input binary signal with its exact 1-bit delayed replica. Then the three-level electrical signal is used to drive a MZ (Mach Zehnder) interferometer type modulator biased at null to generate the ODB signal. At 10 Gbps data rate, dispersion limited transmission distance of 120 km in SMF is obtained by applying the ODB signal. In addition, sharp cut-off filtering of the driving signal is proposed by K. Yonenaga and S. Kuwano in "Dispersion-Tolerant Optical Transmission System Using Duo-binary Transmitter and Binary Receiver", J. Lightwave Technol, Vol. 15, pp. 1530-1537 (1997).

A partial response method of generating ODB signal was described in U.S. Pat. No. 5,867,534, "Optical Transmission Method with Reduced Sensitivity to Dispersion, Transmission Device and System For Implementing this Method" by Price, et al. A quasi three level electrical signal is first generated by passing an input NRZ signal through a narrow filter with bandwidth about 25%-30% of the data rate. Then the three-level electrical signal is used to drive a MZ modulator biased at null to generate the ODB signal. At 10 Gbps data rate, dispersion limited transmission distance of 210 km in SMF is obtained by applying the partial response method.

It is recognized that the longer transmission distance of an ODB signal is not entirely due to the narrower bandwidth. The "bumps" in the optical signal near the "0" bit state also plays a very important role in extending the transmission distance. The "bumps" are by-products of both partial response method and classical 1-bit delayed method using sharp cut-off filters. Since the bumps have 180 degrees phase shift to the adjacent "1" bit, the destructive interference between the bump and the adjacent "1" bit would help to confine the broadening of the "1" bit pulse. Hence the dispersion penalty would be reduced accordingly. Due to its long transmission distance and its simple implementation, the partial response method is the most widely used ODB method, and is often referred as THE ODB method.

The "bumps" can be also introduced using a fractional delay, instead of the whole one-bit delay, in the classical ODB method. This method is described in U.S. Pat. No. 6,623,188, "Dispersion Tolerant Optical Data Transmitter" by Dimmick, et al. A four-level electrical signal is generated by combining an input binary signal with its delayed complement through a differential amplifier in this disclosure. The four-level electrical signal is then used to drive a MZ modulator biased at null to generate a four-level optical field, which could be transmitted of 150 km in SMF without any band-limiting filters at 10 Gbps data rate.

Theoretically, combining an input binary signal with its delayed complement through a differential amplifier is equivalent to combining the input binary signal with its delayed replica. Within the frequency domain, this is equivalent to passing the signal through a periodical filter with a frequency response, formulated as:

$$\text{Filter}(f) = \frac{1 + e^{i \cdot 2 \cdot \pi \cdot f \cdot \Delta t}}{2} \qquad (1)$$

where $\Delta t$ is the time delay. In contrast, the partial response method requires low pass filters with smooth falling "tails" at high frequencies. The combined effect of the Equation 1 and the intrinsic bandwidth of the driving circuit lead to the fractional delay method giving similar results as the partial response method.

Using frequency chirp for extending transmission distance was described in U.S. Pat. No. 6,337,756, "Optical Transmitter System and Method". A method to generate a classical 1-bit delayed ODB signal with frequency chirp was disclosed. Simulation shows that with small negative frequency chirp, transmission distance could be slightly improved over classical ODB.

Chirped ODB modulation was studied in "Chirped duo-binary transmission for mitigating the self-modulation limiting effect", presented at the OFC 2001, March 2000 by M. Wicher, et al. It shows that negative chirp could improve signal quality at shorter distance (<150 km at 10 Gbps) while positive chirp could improve signal quality at distances greater than 150 km, for example, a positively chirped signal was found to transmit greater than 250 km. In addition, the positive chirp vas also found to reduce self phase modulation effect.

In the description of "Cost-effective optical chirped duo binary transmitter using an electro-absorption modulated laser", IEEE Photon Technology Letters, Vol. 17, pp. 905-907, April 2005 by Hanlim Lee, et al; positively chirped ODB signals were generated with a combination of electro-absorption modulated laser (EML) and a MZ modulator. A similar result was obtained by demonstrating that positively chirped ODB signal at 10 Gbps could be transmitted over 250 km in SMF at wavelength around 1550 nm.

FIG. 1 is a schematic diagram illustrating a conventional ODB transmitter 100. An electrical. NRZ source 110 is fed into a pre-coder 120, which is used to make the final optical output signal intensity of this transmitter 100 to be as the same as the input NRZ source 110. In one case, the pre-coder 120 could be a simple XOR gate, with one input being connected to the complement of the incoming NRZ data signal and the other input being connected to the one-bit delayed XOR gate output. The output of the pre-coder 120 is sent into an ODB encoder 130, which produces a three-level or a four level signal ce(t) to a data driver 140. As described earlier, the ODB encoder 130 could be implemented using the delay-and-combine methods or using partial response method. The output of the ODB encoder 130 is amplified by the data driver and forwarded to drive a MZ modulator 150, which also receives optical source from a laser apparatus 160. The optical output of the MZ modulator is an ODB signal where the optical intensity I(t) follows the input NRZ signal d(t).

The partial response method is the simplest one to generate chirp-free ODB signals with large dispersion tolerance. However, all chirp-free ODB signals are very sensitive to non-linear distortion. For example, SPM (self phase modulation) on the transmitting signals can significantly reduce their transmission distance because SPM makes a negative frequency shift at the rising edge and a positive frequency shift at the falling edge, which is generally referred to as a negative chirp. Coupled to the dispersion, the frequency domain distortion is converted to time domain distortion, which is the source of non-linear penalty.

Therefore, a positive pre-chirp could be intentionally added to the transmitting signal to compensate the SPM caused negative chirp in order to reduce introduced non-linear penalty. The chirped ODB methods should have better performance with higher signal launch power. However, the methods disclosed in prior art used double optical modulations, which require precise time alignment between the electrical signals driving the two modulators. These two driving signals in the chirped ODB methods are data patterns; one is NRZ signal and another is pre-coded data. The variable delay lines needed for the timing alignment have to have uniform response over a broad bandwidth, which are usually bulky and expensive. This is a big obstacle for the practical implementation of the chirped ODB modulation methods.

Thus there is a need for an improved and practical method to generate chirped ODB signals.

SUMMARY OF THE INVENTION

Therefore, in accordance with the previous summary, objects, features and advantages of the present disclosure will become apparent to one skilled in the art from the subsequent description and the appended claims taken in conjunction with the accompanying drawings.

This present disclosure provides an optical transmission method and system. The system includes a pre-coder for pre-coding an input signal into a pre-coded signal, an encoder/separator coupled to the pre-coded signal and arranged to encode the pre-coded signal into a first encoded signal with 0 degree phase shift and a second encoded signal with 180 degree phase shift, and an optical modulator for providing optical intensity modulation to the first and second encoded signals with an light source such that the intensity of an output optical duo-binary (ODB) signal with frequency chirp has identical logic sequence as the input signal.

The present invention offers longer transmission distance and better tolerance to non-linear effects comparing to prior art. Furthermore, a single modulator of the present invention is much simpler and less expensive than those methods using double optical modulations. It also makes practical implementation of chirped ODB signal possible.

BRIEF DESCRIPTION OF THE DRAWINGS

The accompanying drawings incorporated in and forming a part of the specification illustrate several aspects of the present invention, and together with the description serve to explain the principles of the disclosure. In the drawings.

DETAILED DESCRIPTION

Figure 1:
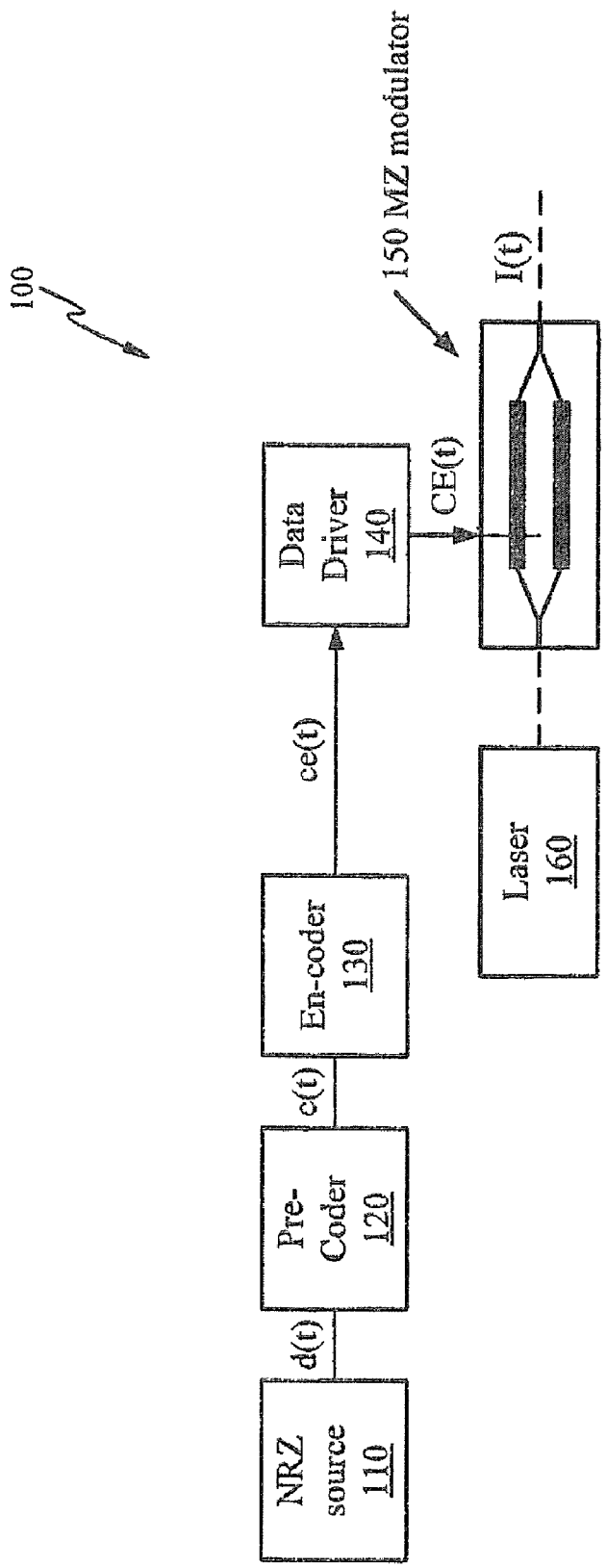
FIG. 1 is a schematic diagram illustrating a conventional ODB transmitter.

Reference will now be made in detail as to the description of the invention as illustrated in the drawings. While the invention will be described in connection with these drawings, there is no intent to limit it to the embodiments disclosed therein. On the contrary, the intent is to cover all alternatives, modifications and equivalents included within the spirit and scope of the invention as defined by the appended claims.

The present disclosure describes several embodiments given below. It is understood, however, that the embodiments below are not necessarily limitations to the present disclosure, but are used as typical implementations of the invention.

It will be appreciated from the description provided herein that a variety of alternative embodiments and implementations may be realized, consistent with the scope and spirit of the present invention.

Figure 2:
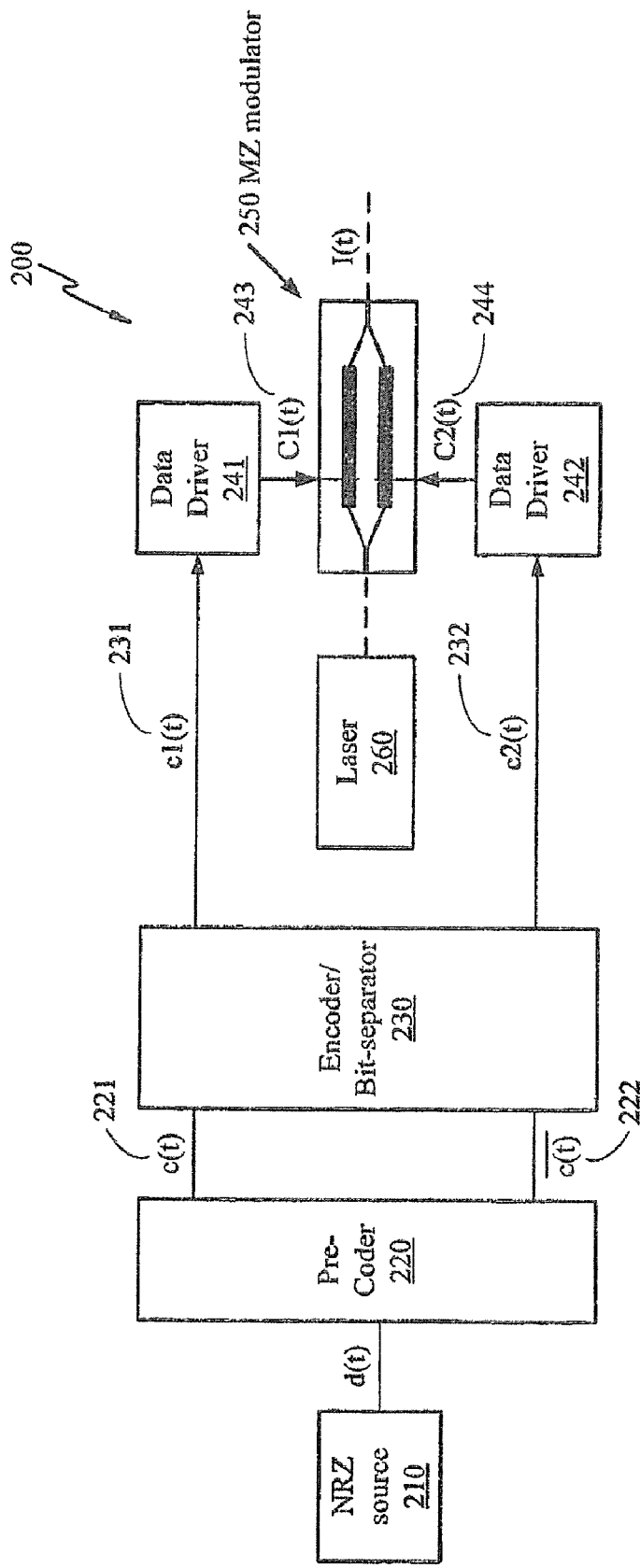
FIG. 2 is a schematic diagram of a chirped ODB transmitter according to one embodiment of the present invention.

FIG. 2 is a schematic diagram of a chirped ODB transmitter 200 in accordance with one embodiment of the present invention. An electrical NRZ source 210 provides an input d(t) to be fed into a pre-coder 220. Both two complementary outputs c(t) 221 and $\overline{c(t)}$ 222 of the pre-coder 220 are sent to an integrated ODB encoder/bit-separator 230, which performs a predetermined encoding process and then separates the bits intended for each optical phase in an ODB modulation. After separation, those bits, intended for 0 degree phase shift, are sent to one output of this integrated ODB encoder/bit-separator 230. On the other hand, the other bits, intended for 180 degree phase shift are sent to another output of the integrated ODB encoder/bit-separator 230. In one example, these two outputs are denoted as a first output c1(t) 231 and a second output c2(t) 232, respectively. Then the two separated sequences, c1(t) 231 and c2(t) 232, are amplified by a first and a second data drivers 241 and 242 to drive two separate inputs of a dual drive MZ modulator 250, respectively. The MZ modulator 250, receiving optical source from a laser apparatus 260, generates an ODB signal I(t) 251 with frequency chirp. The sign of the frequency chirp is determined by choosing either C1(t) and C2(t) signal, or the complements, $\overline{C1(t)}$ and $\overline{C2(t)}$, as the driving signals.

Figure 3A:
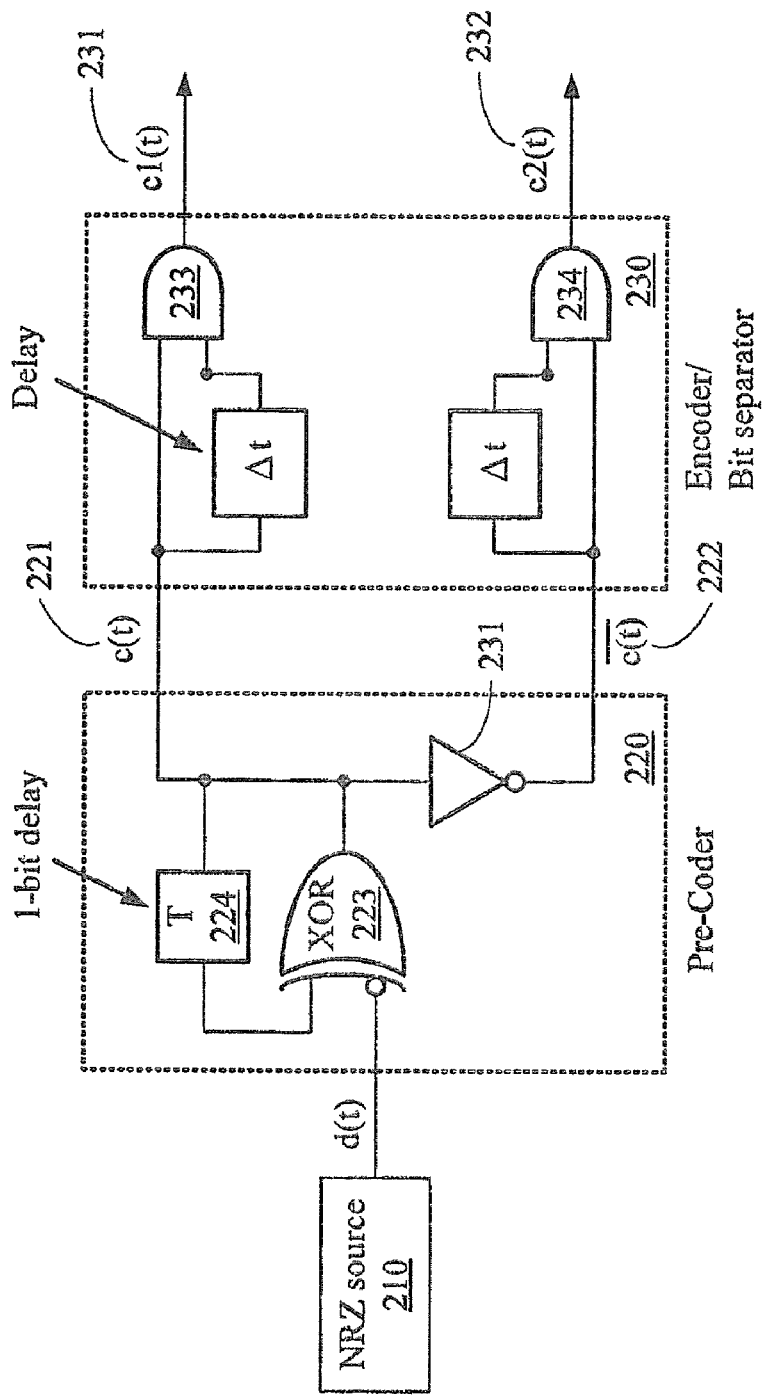
FIG. 3A is a schematic diagram of the pre-coder and the ODB encoder/bit-separator shown in FIG. 2.

FIG. 3A is a schematic diagram of the pre-coder 220 and the ODB encoder/bit-separator 230 shown in FIG. 2. In this embodiment, the pre-coder 220 includes an XOR gate 223 with an input receiving d(t) from the NRZ source 210. The other input of the XOR gate receives a one-bit delayed output of this XOR gate 223. The output of the XOR gate 223 is referenced as the output signal c(t) 221. On the other hand, the complementary output signal $\overline{c(t)}$ 222 is generated by an inverter 225 from the output of the XOR gate 223.

The ODB encoder/bit-separator 230 comprises a first and a second AND gates 233 and 234. The first AND gate 233 takes the output signal c(t) 221 and its delayed replicated signal c(t−Δt) as inputs in order to generate the first output c1(t) 231. Similarly, the second AND gate 234 takes the complementary output signal $\overline{c(t)}$ 222 and its delayed replicated signal $\overline{c(t-\Delta t)}$ as inputs in order to generate the second output c2(t) 232. In one example of this embodiment, the time delay, Δt, can be ranged from 0.3 to 1 bit period.

Figure 3B:
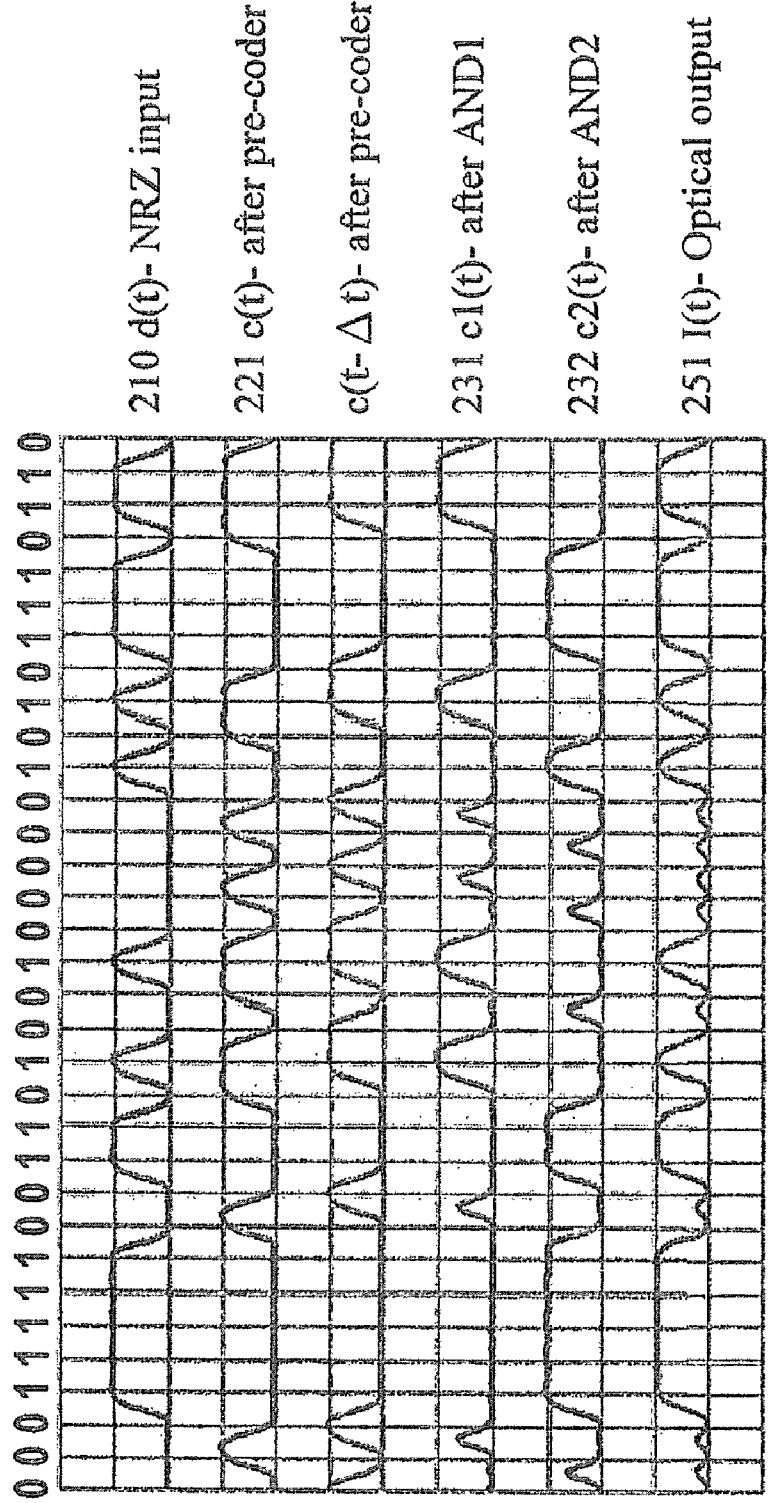
FIG. 3B is a timing diagram illustrating signals in each stage of the embodiment shown in FIG. 3A.

FIG. 3B is a timing diagram illustrating signals in each stage of the embodiment shown in FIGS. 2 and 3A. In this diagram, there are six staged timing sequences, the NRZ input signal d(t) 210, c(t) 221, c(t−Δt), c1(t) 231, c2(t) 232, and the final output I(t) 251. It is assumed that the time delay, Δt, is 0.7-bit period. Some narrow pulses with 0.3-bit duration could be observed in c1(t) 231 and c2(t) 232 accordingly. The finite response of the circuit, which is at 75% of data rate, lowered the amplitude of these narrow pulses, forming the "bumps". At the bottom, the timing sequence of I(t) 251 is the optical output of the dual drive MZ modulator 250.

Figure 4A:
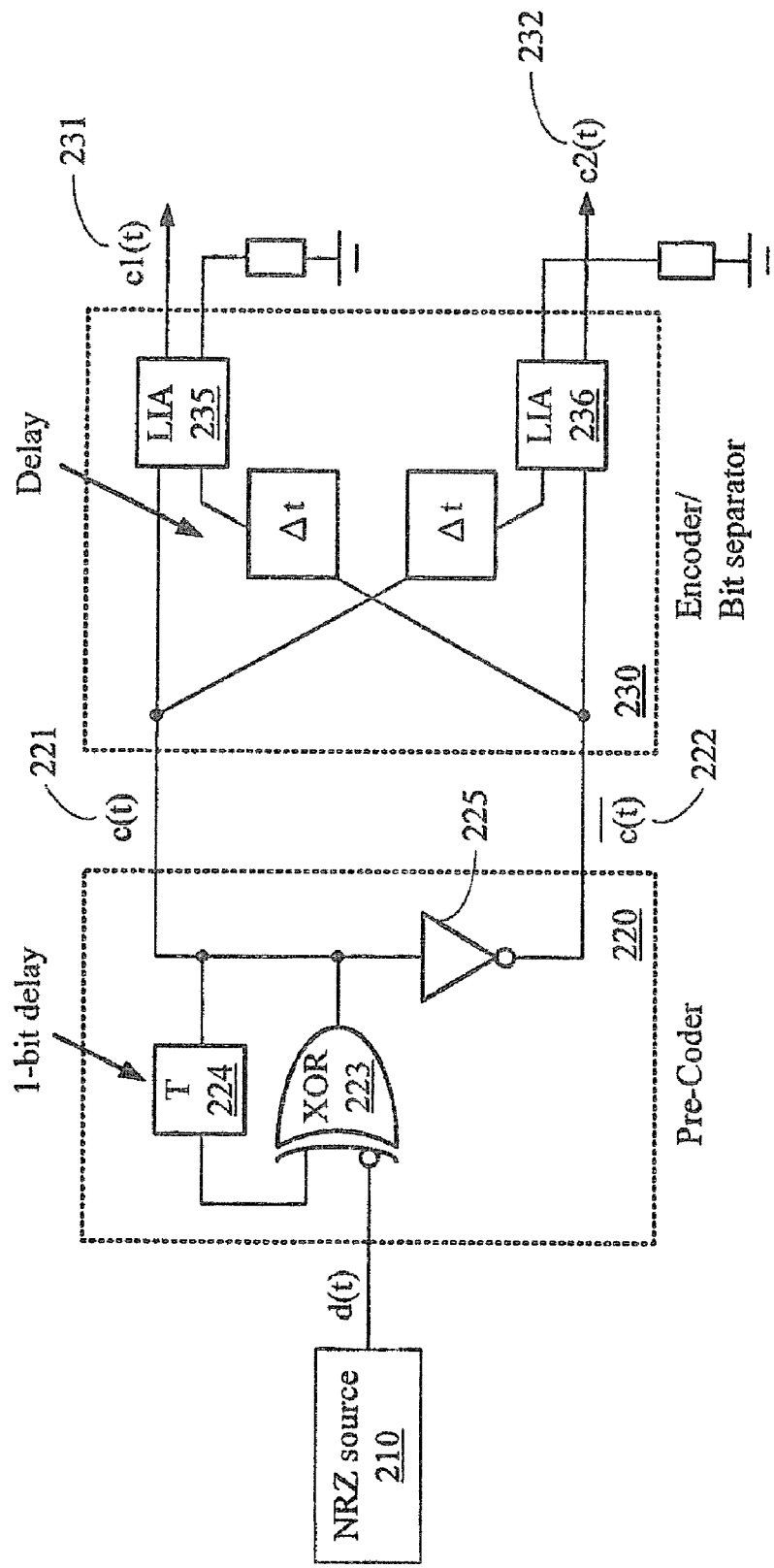
FIG. 4A is another schematic diagram of the pre-coder and the ODB encoder/bit-separator shown in FIG. 2.

FIG. 4A is another schematic diagram of the pre-coder 220 and the ODB encoder/bit-separator 230 shown in FIG. 2. Similar to FIG. 3A, two complementary outputs c(t) 221 and $\overline{c(t)}$ 222 of the pre-coder 220 are sent into the ODB encoder/bit-separator 230 as inputs. However, in this embodiment, the ODB encoder/bit-separator 230 comprises a first and a second LIA (differential limiting amplifiers) 235 and 236 instead of the two AND gates 233 and 234 shown in FIG. 3A. The basic operational function of an LIA is that when the total input signal level is higher than a specified threshold level, the binary output of the LIA would be switched to logic "high"; otherwise, the binary output would be logic "low". With a proper set threshold level, either the positive or the negative pulses from the differential input signals could be filtered or selected. The first LIA 235 takes the output c(t) 221 and the delayed complementary output $\overline{c(t)}$ 222 as inputs. In parallel, the second LIA 236 takes the delayed output c(t) 221 and the complementary output $\overline{c(t)}$ 222 as inputs. Similar to the embodiment shown in FIG. 3A, the time delay, Δt, in this embodiment can range from 0.3 to 1 bit period. Depending on the length of the time delay, the differential input signals of these two LIA 235 and 236, c(t)−$\overline{c(t-\Delta t)}$ and c(t−Δt)−$\overline{c(t)}$, could be three-level or four-level signals. The differential input signals are treated as AC signals, which swing from −1 to +1. Given a proper positive threshold, the output of the first LIA 235 could be substantially similar to the output of the first AND gate 233 shown in FIG. 3A. On the other hand, given a proper negative threshold, the complementary output of the second LIA 236 could be substantially similar to the output of the second AND gate 234 shown in FIG. 3A.

Figure 4B:
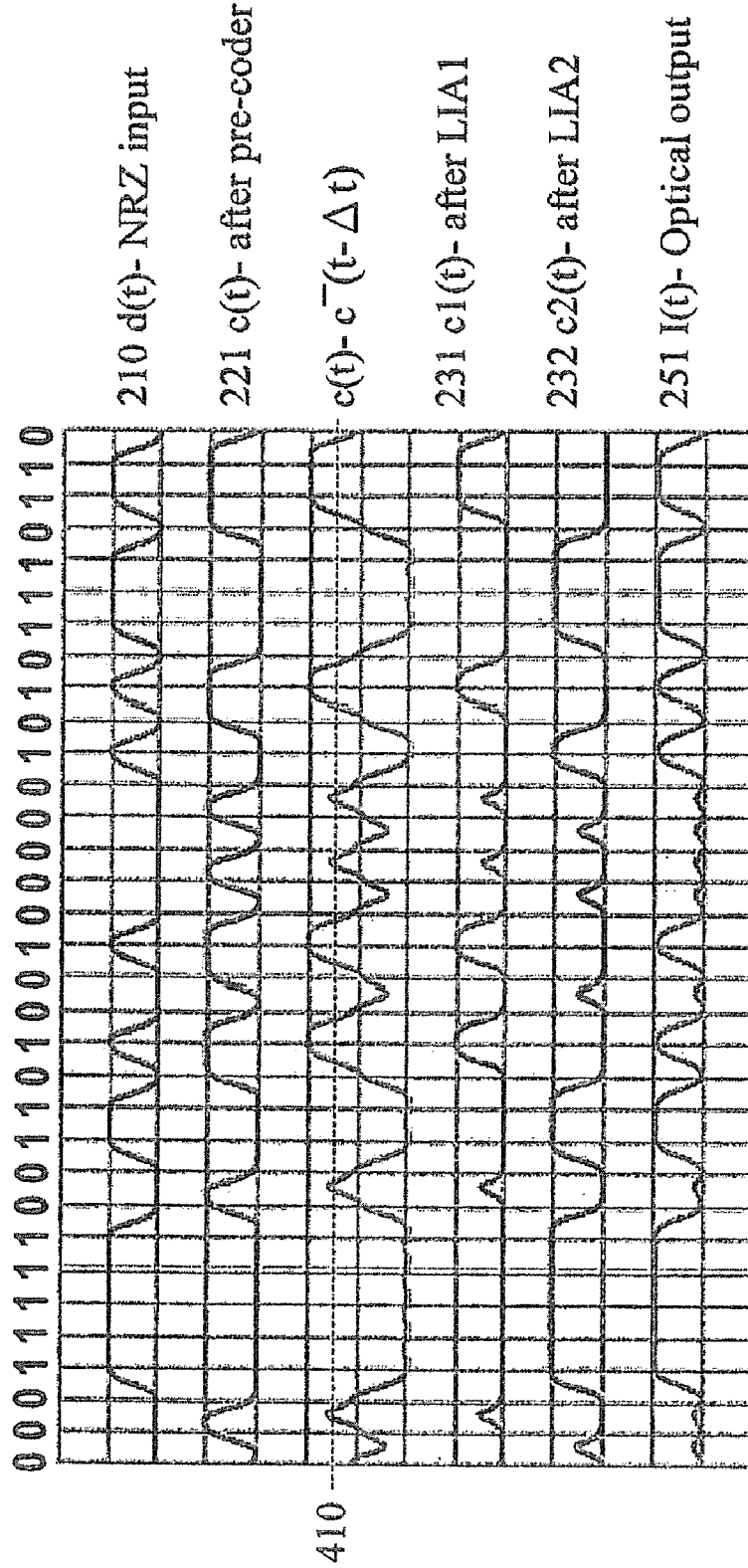
FIG. 4B is a timing diagram illustrating signals in each stage of the embodiment shown in FIG. 4A.

FIG. 4B is a timing diagram illustrating signals in each stage of the embodiment shown in FIG. 4A. In this diagram, there are six timing sequences, the NRZ input signal d(t) 210, c(t) 221, c(t)−$\overline{c(t-\Delta t)}$, c1(t) 231, c2(t) 232, and the final output I(t) 251. Except for the third timing sequence c(t)−$\overline{c(t-\Delta t)}$, the rest of five sequences are also shown in FIG. 3B. It is assumed that the time delay, Δt, is 0.7-bit period in this embodiment. In addition, a threshold level 410 of the first LIA 235 is set at +0.5 by assuming that c(t)−$\overline{c(t-\Delta t)}$ swings between −1 and +1. All signals above this threshold level line 410 are kept by the first LIA 235 as the fourth timing sequence, c1(t) 231. On the other hand, a threshold level (not shown) of the second LIA 236 could be also set at −0.5 by assuming that c(t−Δt)−$\overline{c(t)}$ ranges between −1 and +1. As a result, the output of this second LIA 236 is shown as the fifth timing sequence, c2(t) 232. The fourth and fifth timing sequences of FIG. 4B resemble the counterparts shown in FIG. 3B. At the bottom, the timing sequence, I(t) 251, is the optical output of the dual drive MZ modulator 250.

Figure 5A:
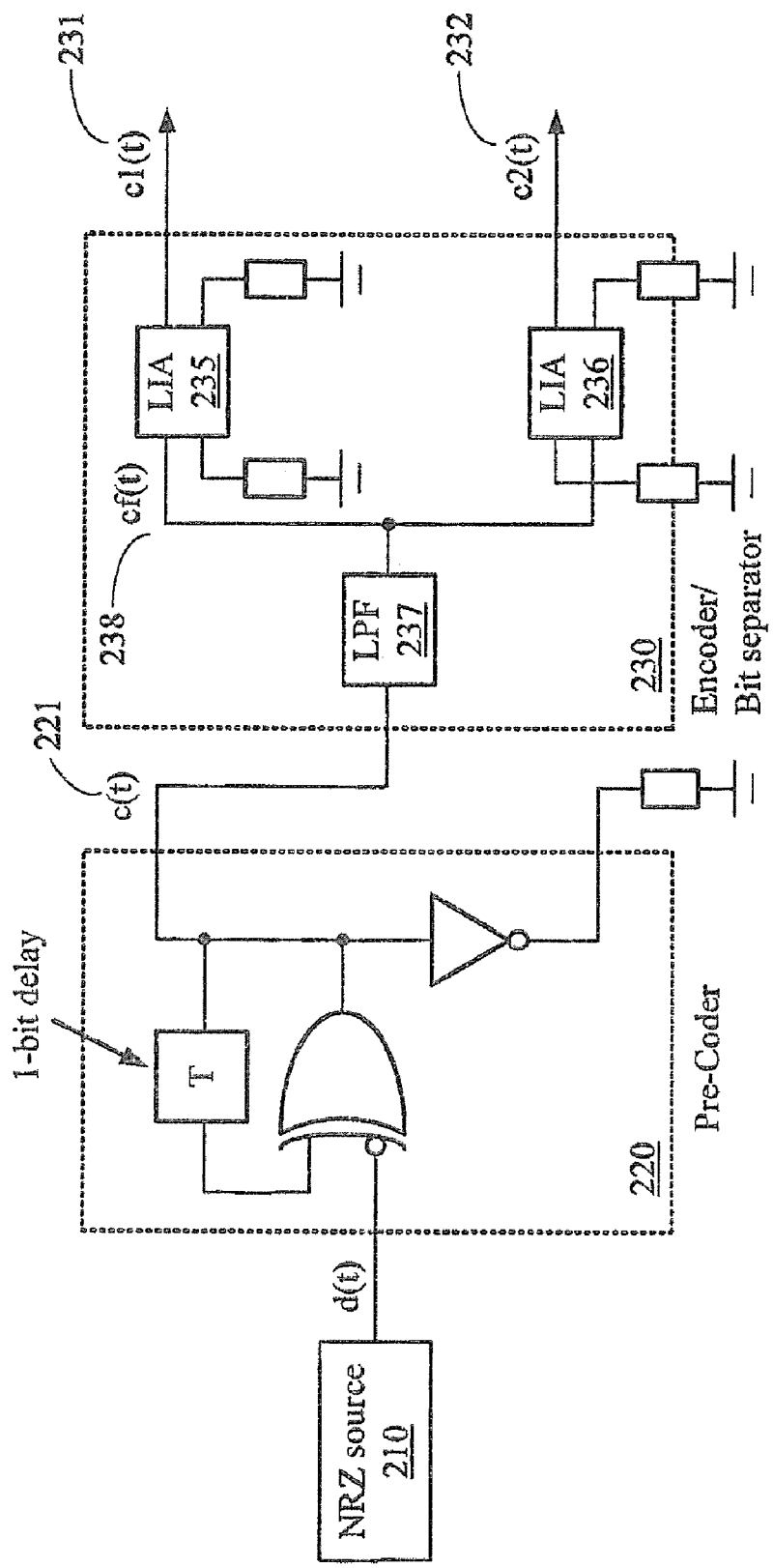
FIG. 5A is another schematic diagram of the pre-coder and the ODB encoder/bit-separator shown in FIG. 2.

FIG. 5A is another schematic diagram of the pre-coder 220 and the ODB encoder/bit-separator 230 shown in FIG. 2. Unlike the embodiments shown in the previous FIGS. 3A and 4A, only the output signal c(t) 221 is sent to the ODB encoder/bit-separator 230, and its complementary one is grounded. In this embodiment, the ODB encoder/bit-separator 230 further comprises a LPF (low-pass-filter) 237 and the first and second LIA 235 and 236. In one example, the bandwidth of the LPF 237 could be set between 25% and 65% of data rate. Thus the output signal cf(t) 238 of the LPF 237 would be a four-level signal, with shorter pulses having lower amplitudes than those in the conventional art. The output signal cf(t) 238 is treated as an AC signal, which swings in the range from −0.5 to +0.5, and splits into the one input of the first LIA 235 and another input for the second LIA 236. Given a properly set threshold level, the output of the first LIA 235 could be substantially similar to the output of the first AND gate 231. Similarly, the output of the second LIA 236 could be substantially similar to the output of the second AND gate 232 shown in FIG. 3A.

Figure 5B:
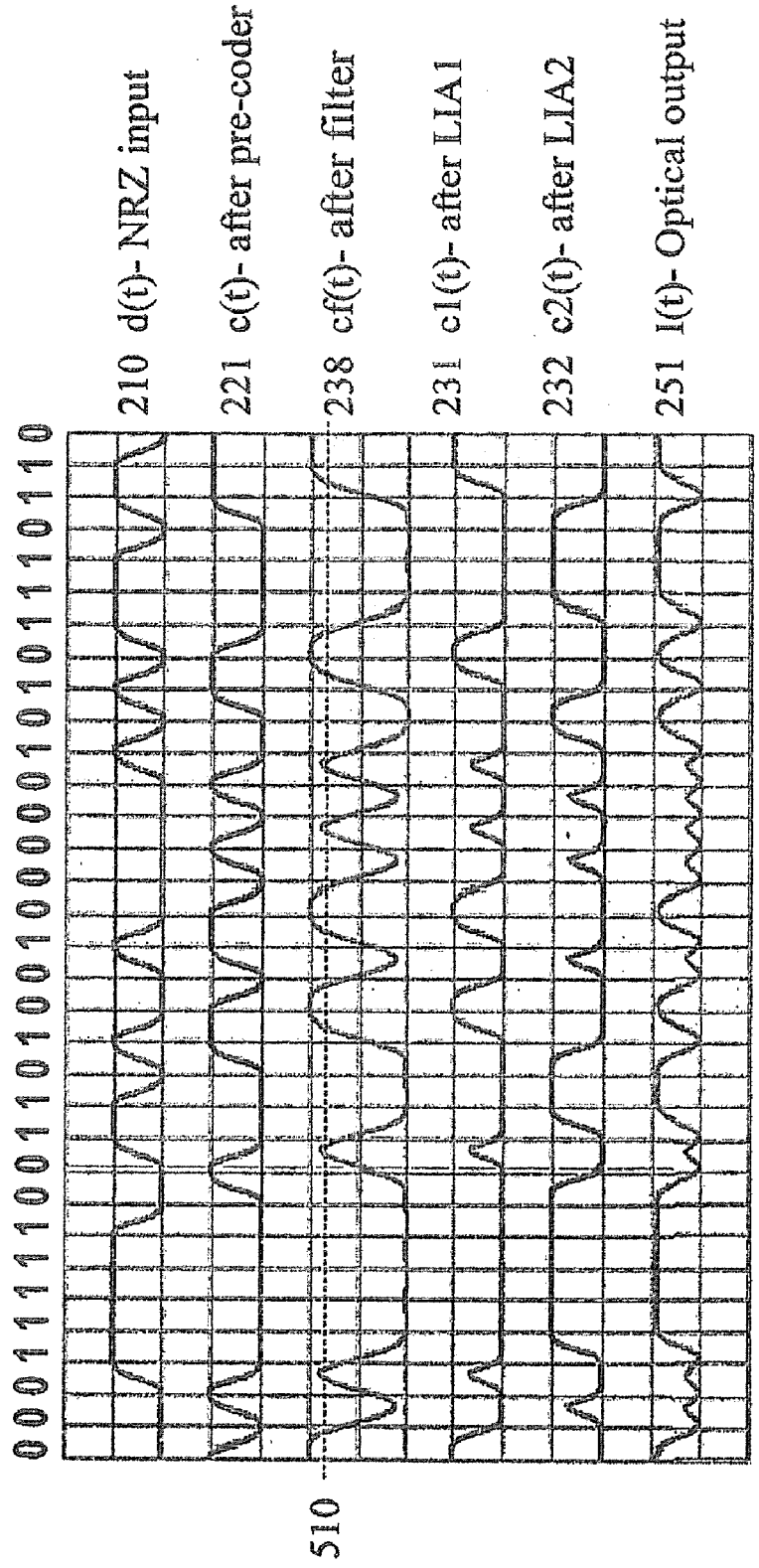
FIG. 5B is a timing diagram illustrating signals in each stage of the embodiment shown in FIG. 5A.

FIG. 5B is a timing diagram illustrating signals in each stage of the schematic shown in FIG. 5A. In this diagram, there are six timing sequences, the NRZ input signal d(t) 210, c(t) 221, cf(t) 238, c1(t) 231, c2(t) 232, and the final output I(t) 251. Except for the third timing sequence cf(t) 238, the rest of five sequences are similar to those shown in FIGS. 3B and 4B. It is assumed that the bandwidth of the LPF 237 is set to be 50% of data rate and the magnitude of the signal is expanded by a factor of 2 for illustration. A dash line 510 is used to mark the threshold level, +0.33, for the first and second LIA 235 and 236, by assuming that the signal, cf(t) 238, swings in the range of −0.5 to +0.5. At the bottom, the timing sequence, I(t) 251, is the optical output of the dual drive MZ modulator 250.

Figure 6A:
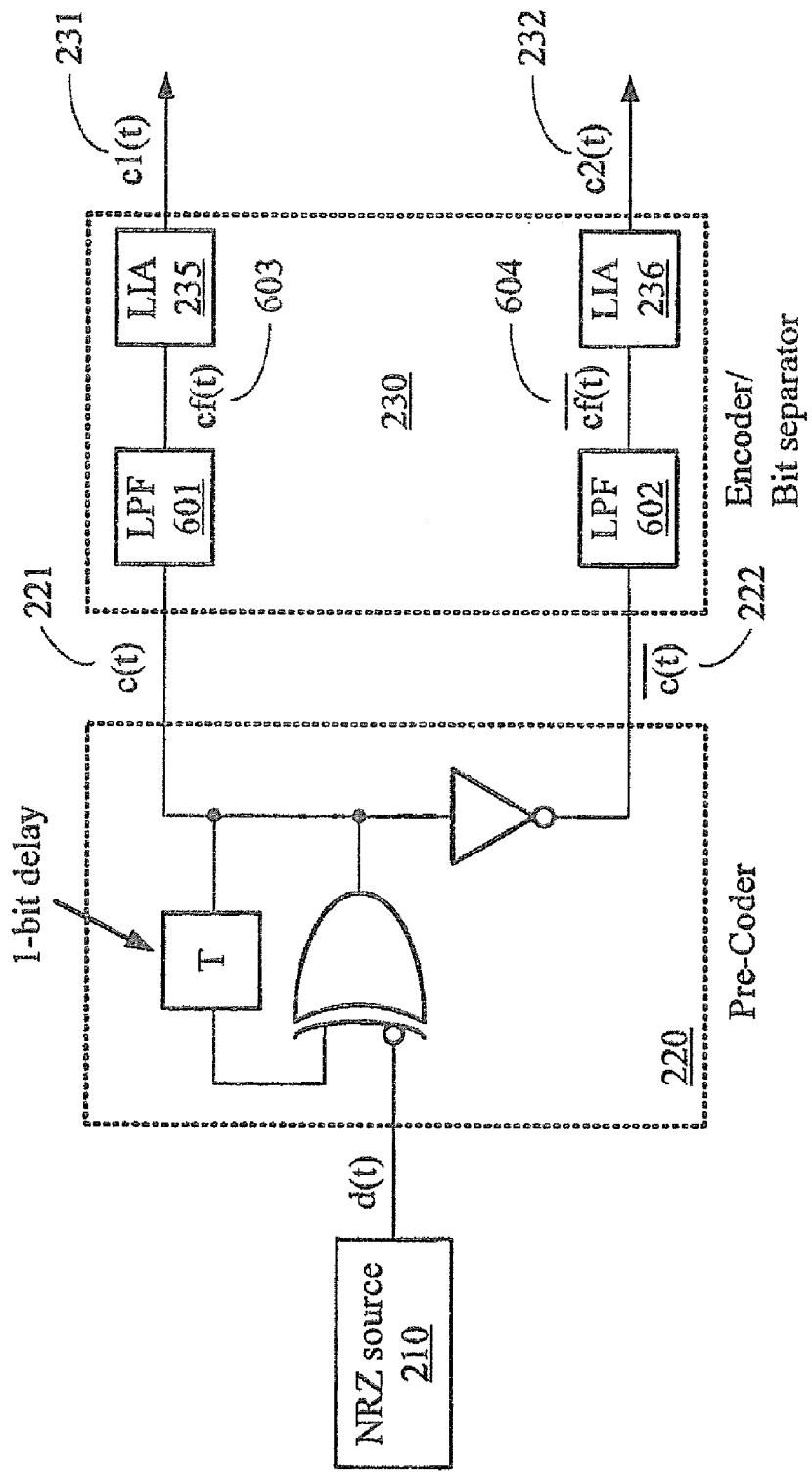
FIGS. 6A and 6B are two schematic diagrams of the pre-coder and the ODB encoder/bit-separator shown in FIG. 2.

FIG. 6A is another schematic diagram of the pre-coder 220 and the ODB encoder/bit-separator 230 shown in FIG. 2. In this embodiment, the encoder/bit-separator 230 comprises a first and a second LPF 601 and 602, that receive the complementary outputs c(t) 221 and $\overline{c(t)}$ 222 as inputs, respectively. In one example, the bandwidth of both LPF 601 and 602 can be set between 25% and 65% of the data rate. Both of the output signals cf(t) 603 and $\overline{cf(t)}$ 604 are four-level signals and treated as AC signals, swinging in the range from −0.5 to +0.5. Both cf(t) 603 and $\overline{cf(t)}$ 604 are sent to the first and second LIA 235 and 236, which have a common positive threshold, respectively. As a result, the output of the first LIA 235 could be substantially similar to the output of the first AND gate 231. Similarly, the output of the second LIA 236 could be substantially similar to the output of the second AND gate 232 shown in FIG. 3A. When the bandwidth of the first and second LIA 235 and 236 are set to be 50% of the data rate and the common threshold is set at +0.33, the resulting timing sequences diagram of this embodiment would be substantially similar to that in FIG. 5B.

Figure 6B:
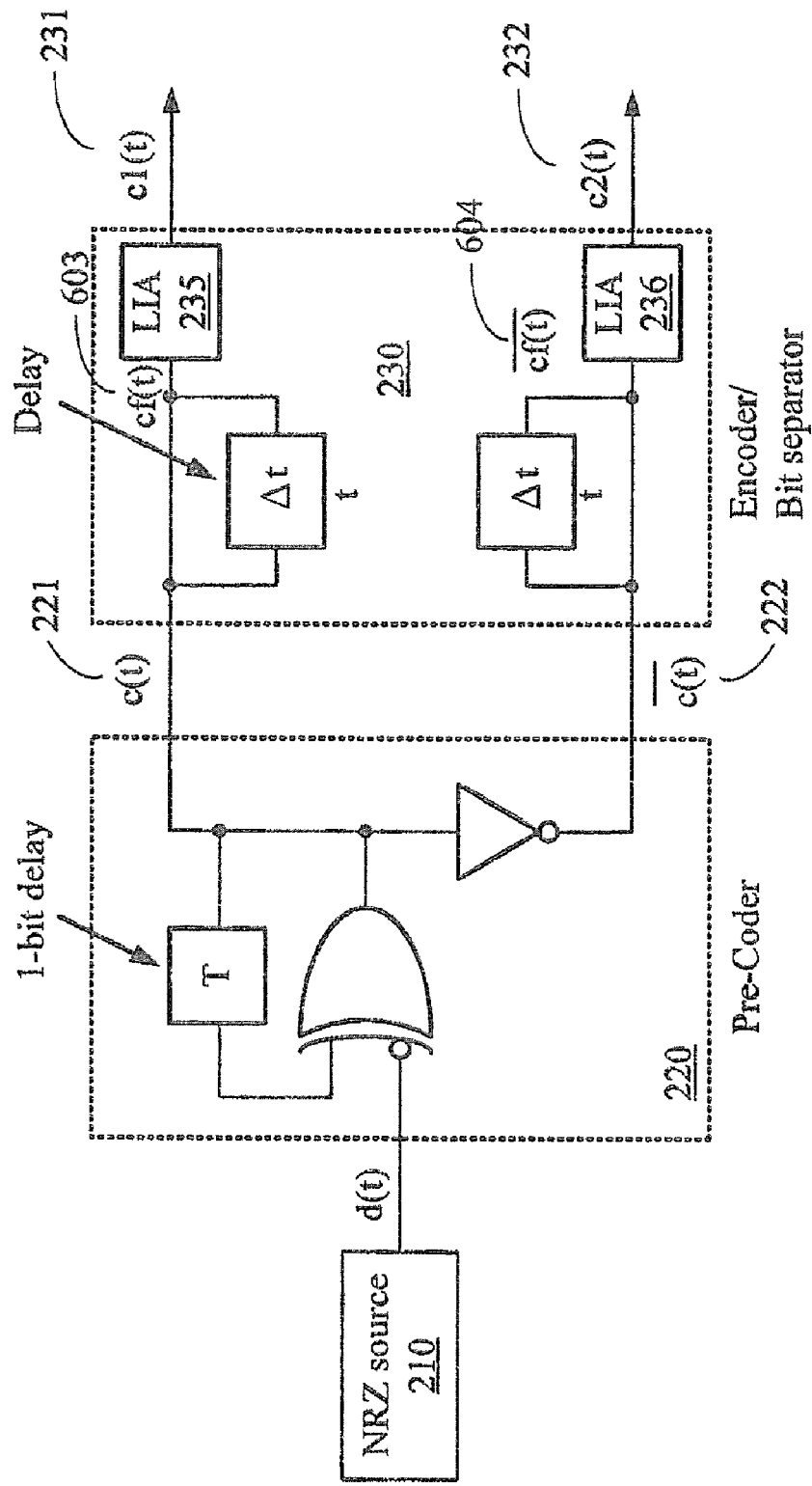

FIG. 6B is yet another schematic diagram of the pre-coder 220 and the ODB encoder/bit-separator 230 shown in FIG. 2. This embodiment is essentially identical to that shown in FIG. 6A, except that the two LPF 601 and 602 are substituted by two unbalanced MZ interferometer filters. An unbalanced MZ interferometer filter is formed by first splitting an input signal to two signals, with each passing a path with unequal length, and then recombining the two split signals. The unequal length causes a relative delay, Δt, between the signals. Similar to the embodiment shown in FIG. 3A, the time delay, Δt, in this embodiment can range from 0.3 to 1 bit period. As a result, the output of the first LIA 235 could be substantially similar to the output of the first AND gate 231. Similarly, the output of the second LIA 236 could be substantially similar to the output of the second AND gate 232 shown in FIG. 3A. When Δt is set to 0.7 bit period, the resulting timing sequences diagram of this embodiment would be substantially similar to that in FIG. 4B.

Figure 7:
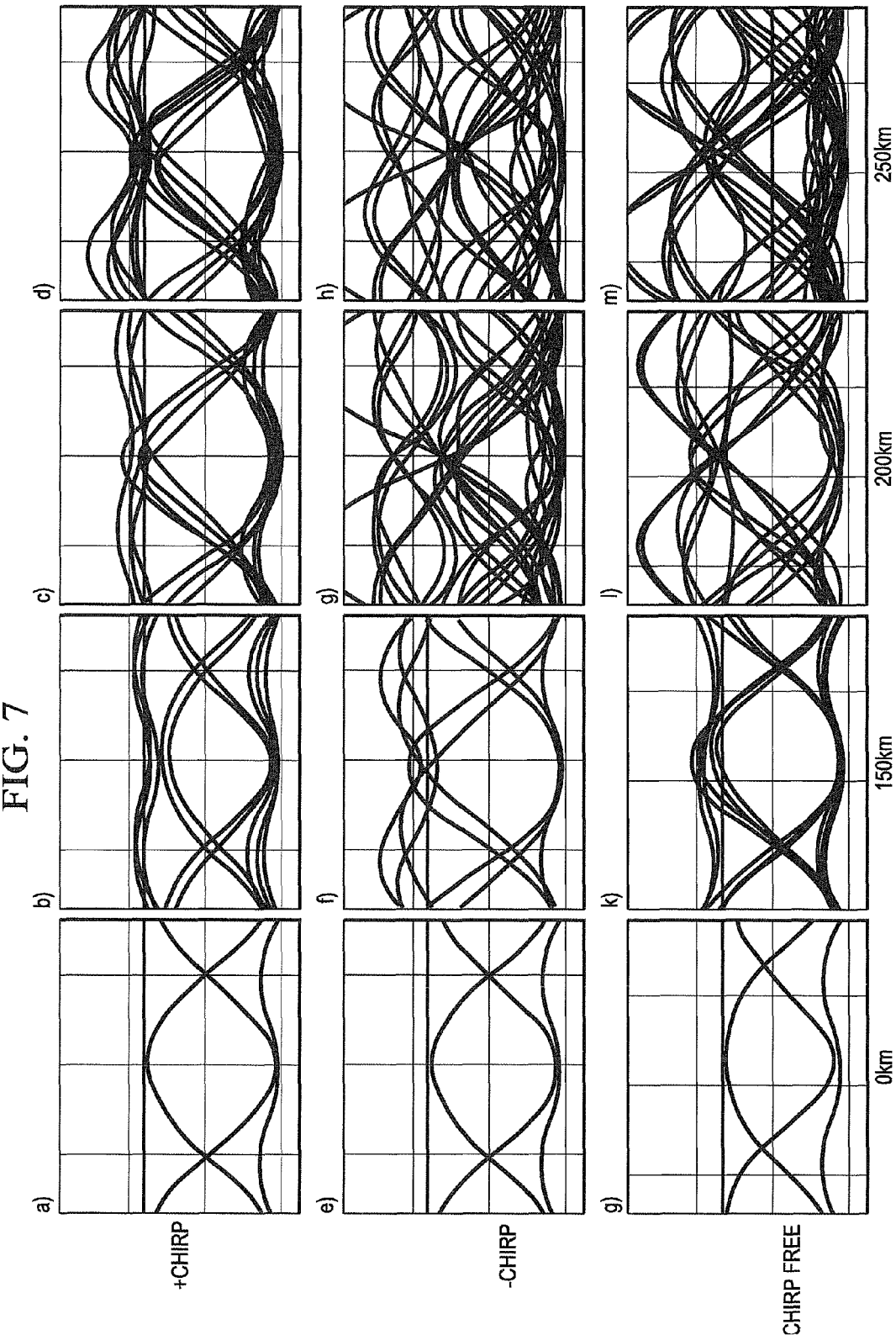
FIG. 7 is a diagram showing signal distortions of a positive chirped, a negative chirped, and a chirp free 10 Gbps ODB signals at various distances.

Please refer to FIG. 7, which contains diagrams a) to m) for showing signal distortions of a positive chirped, a negative chirped, and a chirp free 10 Gbps ODB signals at various distances. The four columns show eye diagrams at 0 km, 100 km, 200 km, and 250 km from left to right. The three rows show eye diagrams of the positive chirped, the negative chirped, and the chirp free ODB signals. If the driving voltage for the MZ modulator 250 is 0.5 Vπ, the positive chirped (from a) to d)) and negative chirped (from e) to h)) ODB signals are generated according to the embodiments shown in FIG. 2, using AND gates for illustration purpose with the understanding that the results of the rest three embodiments are substantially similar to these two rows. It is clear from observing these eye diagrams to conclude that the positive chirped ODB signal could reduce signal distortion at longer distances.

In summary, the present invention offers longer transmission distance and better tolerance to non-linear effects than conventional art. Furthermore, using a single modulator is much simpler and economical than those conventional methods using double optical modulations. It also makes practical implementation of chirped ODB signals possible.

The foregoing description is not intended to be exhaustive or to limit the invention to the precise forms disclosed. Obvious modifications or variations are possible in light of the above teachings. In this regard, the embodiment or embodiments discussed were chosen and described to provide the best illustration of the principles of the invention and its practical application to enable one of ordinary skilled in the art to utilize the invention in various embodiments and with various modifications as are suited to the particular use contemplated. All such modifications and variations are within the scope of the inventions as determined by the appended claims.

The invention claimed is:

1. An optical transmitter system comprising:
   a pre-coder for pre-coding an input signal into a pre-coded signal;
   an encoder/separator coupled to the pre-coded signal and arranged to encode the pre-coded signal into a first encoded signal with 0 degree phase shift and a second encoded signal with 180 degree phase shift, the encoder/separator comprising,
      a first differential limiting amplifier (LIA) for generating the first encoded signal based on the pre-coded signal and a delayed complement of the pre-coded signal, and
      a second LIA for generating the second encoded signal based on the complement of the pre-coded signal and a delayed pre-coded signal; and
   an optical modulator for providing optical modulation to the first and second encoded signals with a light source such that the intensity of an output optical duo binary (ODB) signal with frequency chirp has identical logic sequence as the input signal.

2. An optical transmitter system of claim 1, wherein a delay time of the delayed pre-coded signal and the delayed complement of the pre-coded signal is the same.

3. An optical transmitter system comprising:
   a pre-coder for pre-coding an input signal into a pre-coded signal;
   an encoder/separator coupled to the pre-coded signal and arranged to encode the pre-coded signal into a first encoded signal with 0 degree phase shift and a second encoded signal with 180 degree phase shift, the encoder/separator comprising,
      a low pass filter (LPF) for filtering the pre-coded signal,
      a first differential limiting amplifier (LIA) for receiving an output of the LPF, and generating the first encoded signal using a first predetermined threshold, and
      a second LIA for receiving the output of the LPF and generating the second encoded signal using a second predetermined threshold; and
   an optical modulator for providing optical modulation to the first and second encoded signals with a light source such that the intensity of an output optical duo binary (ODB) signal with frequency chirp has identical logic sequence as the input signal.

4. An optical transmitter system of claim 3, wherein the output of the LPF is a four-level signal.

5. An optical transmitter system of claim 3, wherein the bandwidth of the LPF ranges between 25% and 65% of data rate of the input signal.

6. An optical transmitter system comprising:
   a pre-coder for pre-coding an input signal into a pre-coded signal;
   an encoder/separator coupled to the pre-coded signal and arranged to encode the pre-coded signal into a first encoded signal with 0 degree phase shift and a second encoded signal with 180 degree phase shift, the encoder/separator comprising, a first low pass filter (LPF) for filtering the pre-coded signal, a second LPF for filtering the complement of the pre-coded signal, a first differential limiting amplifier (LIA) for receiving an output of the first LPF and generating the first encoded signal using a first threshold, and a second LIA for receiving an output of the second LPF and generating the second encoded signal using a second threshold; and an optical modulator for providing optical modulation to the first and second encoded signals with a light source such that the intensity of an output optical duo-binary (ODB) signal with frequency chirp has identical logic sequence as the input signal.

7. An optical transmitter system of claim 6, wherein the outputs of the first and second LPF are four-level signals.

8. An optical transmitter system of claim 6, wherein the bandwidth of the first and second LPF ranges between 25% and 65% of data rate of the input signal.

9. An optical transmitter system comprising:

a pre-coder for pre-coding an input signal into a pre-coded signal;

an encoder/separator coupled to the pre-coded signal and arranged to encode the pre-coded signal into a first encoded signal with 0 degree phase shift and a second encoded signal with 180 degree phase shift, the encoder/separator comprising, a first unbalanced MZ interferometer filters for filtering the pre-coded signal, a second unbalanced MZ interferometer filters for filtering a complement of the pre-coded signal, a first differential limiting amplifier (LIA) for receiving an output of the first LPF and generating the first encoded signal using a first threshold, and a second LIA for receiving an output of the second LPF and generating the second encoded signal using a second threshold; and an optical modulator for providing optical modulation to the first and second encoded signals with a light source such that the intensity of an output optical duo-binary (ODB) signal with frequency chirp has identical logic sequence as the input signal.

10. An optical transmitter system of claim 9, wherein the first and second unbalanced MZ interferometer filters introduce a delayed path for the pre-coded signal and the complement of the pre-coded signal to be split and combined.

11. A method for generating optically duo-binary (ODB) signals with frequency chirp in an optical transmission system, comprising:

pre-coding an input signal into a pre-coded signal;

encoding the pre-coded signal into a first encoded signal with 0 degree phase shift and a second encoded signal with 180 degree phase shift, the encoding comprising, using a first differential limiting amplifier for amplifying the pre-coded signal and a delayed complement of the pre-coded signal, using a second differential limiting amplifier for amplifying the complement of the pre-coded signal and a delayed pre-coded signal, and wherein an output of the first differential limiting amplifier with a first threshold is the first encoded signal and an output of the second differential limiting amplifier with a second threshold is the second encoded signal; and modulating a light source such that an intensity of an output ODB (optical duo-binary) signal with frequency chirp has identical logic sequence as the input signal.

12. The method of claim 11, wherein a delay time of the delayed pre-coded signal and the delayed second pre-coded signal is from 0.3 to 1 bit period.

13. A method for generating optically duo-binary (ODB) signals with frequency chirp in an optical transmission system, comprising:

pre-coding an input signal into a pre-coded signal;

encoding the pre-coded signal into a first encoded signal with 0 degree phase shift and a second encoded signal with 180 degree phase shift, the encoding comprising, a low-pass filtering of the pre-coded signal, a first differential limiting amplifying of an output of the low pass filtering, a second differential limiting amplifying the inversed output of the low pass filtering, and wherein an output of the first differential limiting amplifying with a first threshold is the first encoded signal and an output of the second differential limiting amplifying with a second threshold is the second encoded signal; and modulating a light source such that an intensity of an output ODB (optical duo-binary) signal with frequency chirp has identical logic sequence as the input signal.

14. The method of claim 13, wherein the bandwidth of the filtering is ranged between 25% and 65% of data rate of the input signal.

15. A method for generating optically duo-binary (ODB) signals with frequency chirp in an optical transmission system, comprising:

pre-coding an input signal into a pre-coded signal;

encoding the pre-coded signal into a first encoded signal with 0 degree phase shift and a second encoded signal with 180 degree phase shift, the encoding comprising, a first low pass filtering of the pre-coded signal, a second low pass filtering of the complement of the pre-coded signal, a first differential limiting amplifying of an output of the first low pass filtering, a second differential limiting amplifying of an output of the second low pass filtering, and wherein an output of the first differential limiting amplifying with a first threshold is the first encoded signal and an output of the second differential limiting amplifying with a second threshold is the second encoded signal; and modulating a light source such that an intensity of an output ODB (optical duo-binary) signal with frequency chirp has identical logic sequence as the input signal.

* * * * *